(12) United States Patent
Yawata et al.

(10) Patent No.: US 6,922,229 B2
(45) Date of Patent: Jul. 26, 2005

(54) MANUFACTURING METHOD OF LIQUID CRYSTAL DISPLAY APPARATUS AND SUBSTRATE ASSEMBLING APPARATUS

(75) Inventors: Satoshi Yawata, Kashiwa (JP); Kiyoshi Imaizumi, Ushiku (JP); Masatomo Endoh, Edosaki-machi (JP); Tatsuharu Yamamoto, Ryugasaki (JP)

(73) Assignees: Hitachi Industries Co., Ltd., Tokyo (JP); Sharp Kabushiki Kaisha, Osaka (JP)

( * ) Notice: Subject to any disclaimer, the term of this patent is extended or adjusted under 35 U.S.C. 154(b) by 78 days.

(21) Appl. No.: 10/387,377

(22) Filed: Mar. 14, 2003

(65) Prior Publication Data

US 2003/0232561 A1 Dec. 18, 2003

(30) Foreign Application Priority Data

Mar. 14, 2002 (JP) .................................... 2002-069448
Mar. 27, 2002 (JP) .................................... 2002-087351

(51) Int. Cl.[7] ................................................ G02F 1/13
(52) U.S. Cl. ........................ 349/187; 349/189; 349/190
(58) Field of Search .............................. 349/187, 189, 349/190

(56) References Cited

U.S. PATENT DOCUMENTS 6,304,311 B1 * 10/2001 Egami et al. ............... 349/189

2003/0063251 A1 * 4/2003 Murata et al. .............. 349/189

FOREIGN PATENT DOCUMENTS

JP        2001-133745    * 5/2001   ............. G02F/1/13

* cited by examiner

Primary Examiner—James A. Dudek
(74) Attorney, Agent, or Firm—Antonelli, Terry, Stout & Kraus, LLP

(57) ABSTRACT

One substrate is supported by an attracting and adsorbing operation and by an adhesive means provided inside a pressurizing plate; the other of substrate, on which a liquid crystal agent is dropped, is supported on a table by an attracting and adsorbing operation or by an adhesive means. Then, the pressure inside the chamber is reduced until a designated reduced pressure level is attained, and the pressure is increased after the substrates come firmly into contact with an adhesive agent that has been provided on the other of substrates, so that the individual substrates are attracted and adsorbed by the pressurizing plate and the table, whereby the substrates are laminated while positioning the substrates. Then, by retracting the adhesive means in the pressurizing plate or the table, the adhesive member is removed from the substrate surface, while or after twisting the adhesive member.

16 Claims, 12 Drawing Sheets

T2
T1

T2
T1

T2
T1

MAGNIFIED VIEW OF PART A

MANUFACTURING METHOD OF LIQUID CRYSTAL DISPLAY APPARATUS AND SUBSTRATE ASSEMBLING APPARATUS

BACKGROUND OF THE INVENTION

The present invention relates to a method assembly of a liquid crystal display apparatus, and to an apparatus for assembly of a liquid crystal display apparatus, in which a pair of substrates to be laminated are respectively supported and placed so as to oppose each other in the vacuum chamber, after which those substrates are brought together in face-to-face relationship, with the gap between the substrates being narrowed down in a reduced pressure state.

There are two methods generally used for the assembly of a liquid crystal display apparatus. In one method, a pair of transparent glass substrates, having thin film transistor arrays, are brought together in face-to-face relationship to a distance as small as several $\mu$m and they joined with an adhesive agent (hereinafter referred to also as a sealing material, while the finished substrate is hereinafter referred to as a cell). Then, the airspace formed between those substrates is filled by injection with a liquid crystal material. In another method, the liquid crystal material is drip-fed on the surface of one substrate, on which a closed pattern is formed with a sealing material, so that a filler hole for injection need not be provided, and then the other substrate is placed on the one substrate as the substrates are brought together in face-to-face relationship, so as to be very dose to each other.

As for an assembly apparatus for assembly of the liquid crystal display apparatus by bringing together a pair of substrates in face-to-face relationship, there is a substrate assembly apparatus for supporting the upper-side substrate prior to applying pressure, as disclosed in Japanese Patent Laid-Open Number 2001-133745 (2001). In the apparatus disclosed in this publication, the upper-side substrate is supported by adhesion means, and the substrates are brought together in face-to-face relationship by narrowing down the distance between the substrates. In its preferred embodiment, what are disclosed include a method in which an adhesive sheet is used as the adhesive means, and a configuration in which an open port is provided inside the pressurizing plate and an actuator is provided above the pressurizing plate, so that the adhesive member moves up and down in the open port.

In the configuration disclosed in the above-referenced publication, the substrate is supported so as to contact the adhesive means in an atmospheric pressure state. In case the substrate is supported by adhesive means in an atmospheric pressure state, a problem may occur in that air tends to penetrate through a space between the substrate and the adhesive means which has been created due to the concave and/or convex shape of the surface of the substrate or a deflection of the substrate. Therefore, as the internal pressure of the chamber is reduced, the air contained between the substrate and the adhesive means expands, leading to a weakening of the support, and at worst, to a disabling of the support of the substrate, causing the substrate to come loose from its support.

SUMMARY OF THE INVENTION

An object of the present invention is to provide a substrate laminating apparatus, with which it is possible to definitely support a substrate using a pressurizing plate, a substrate assembly apparatus for laminating the liquid crystal substrates, and an assembly method using the apparatus for assembly of the liquid crystal display apparatus, in order to laminate the substrates with a high degree of accuracy in a state of high-vacuum pressure in which defects will not occur in the liquid crystal display, even if an attempt is made to increase the size of the substrate and to reduce the thickness of the substrate.

In order to achieve the above-stated object, the present invention is characterized by providing a plurality of suction ports for suction and adsorption on a pressurizing plate for supporting one of the substrates; a plurality of adhesive means disposed in open ports for supporting the substrates by adhesive force; and a pressure reduction channel for reducing the pressure inside the airspace formed by the open ports provided for said adhesive means. In addition, a plurality of suction ports for suction and adsorption and a plurality of adhesive means are provided on the table for supporting the other substrate in a similar manner to those provided on the pressurizing plate. And furthermore, after reducing the pressure inside the airspace formed by the open port in the adhesive means, the adhesive means is moved into contact with the substrate to support the substrate.

In another embodiment, at least in the pressurizing plate, the substrate is attracted and adsorbed, as well as supported adhesively, in an atmospheric pressure state; and then, after bonding the substrates under pressure with the adhesive agent provided on either one of the substrates by narrowing down the distance to the substrate placed on the table in a given depressurized atmosphere, the adhesive member is removed from the surface of the laminated substrates by operating a plurality of removing mechanisms provided at the pressurizing plate for removing the adhesive members.

With the pressurizing plate provided inside the vacuum chamber and the table disposed opposite thereto at a distance from said pressurizing plate, one of the liquid crystal substrates is supported by a plurality of adhesive means provided in said pressurizing plate. Then, the other liquid crystal substrate is supported on said table and held with a negative pressure and/or by adhesive means. A sealing material is coated in a loop shape on this other liquid crystal substrate, and a liquid crystal agent is quantitatively dropped in the closed loop area formed by the sealing material. The internal pressure of the vacuum chamber is reduced; and, after positioning both substrates in alignment with each other, laminating of the substrates is tentatively effected by narrowing down the distance between said table and said pressurizing plate. Then the adhesive means provided at said pressurizing plate is removed, and, finally, the liquid crystal display apparatus is completed with both substrates being brought into firm contact by restoring the pressure inside the vacuum chamber to atmospheric pressure, after separating the pressurizing plate from one of the substrates.

BRIEF DESCRIPTION OF DRAWINGS

The present invention will be understood more fully from the detailed description given hereinafter and from the accompanying drawings of preferred embodiments of the present invention, which, however, should not be taken to limit the invention, but are provided only to facilitate an explanation and understanding of the invention.

In the drawings.

DETAILED DESCRIPTION OF THE PREFERRED EMBODIMENTS

The present invention will be discussed hereinafter in detail in terms of the preferred embodiments of the present invention with reference to the accompanying drawings. In the following description, numerous specific details are set forth in order to provide a thorough understanding of the present invention. However, it will be obvious to those skilled in the art that the present invention may be practiced without these specific details. In other instances, well-known structures are not shown in detail in order to avoid unnecessary obscurity of the present invention.

A first embodiment of the present invention will be described with reference to FIG. 1, which shows the overall configuration of a substrate laminating apparatus in accordance with the present invention.

Figure 1:
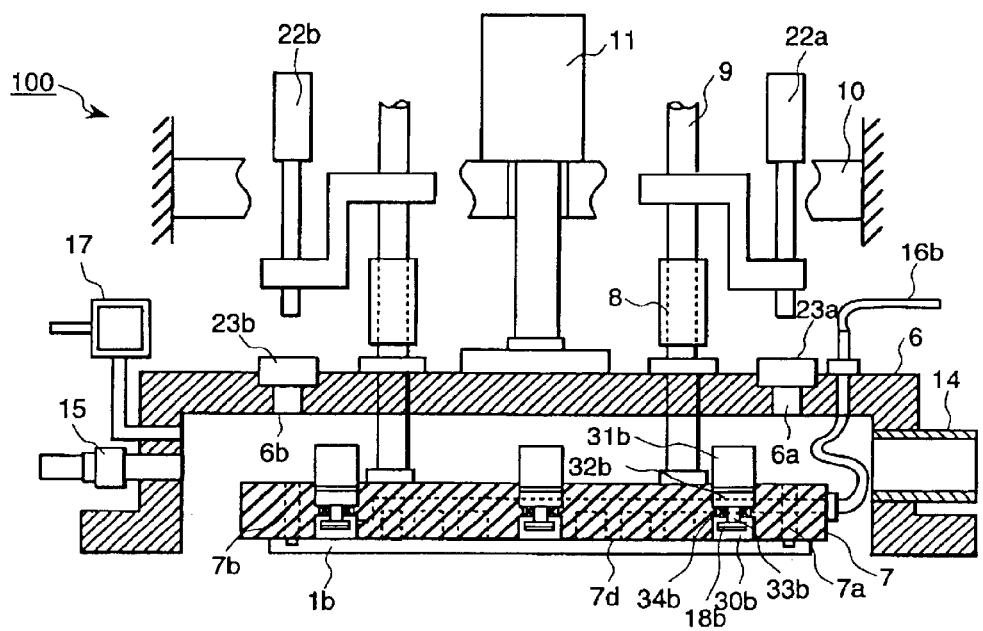
FIG. 1 is a schematic cross-sectional view of the substrate assembly apparatus illustrating one embodiment of the present invention.
Figure 1:
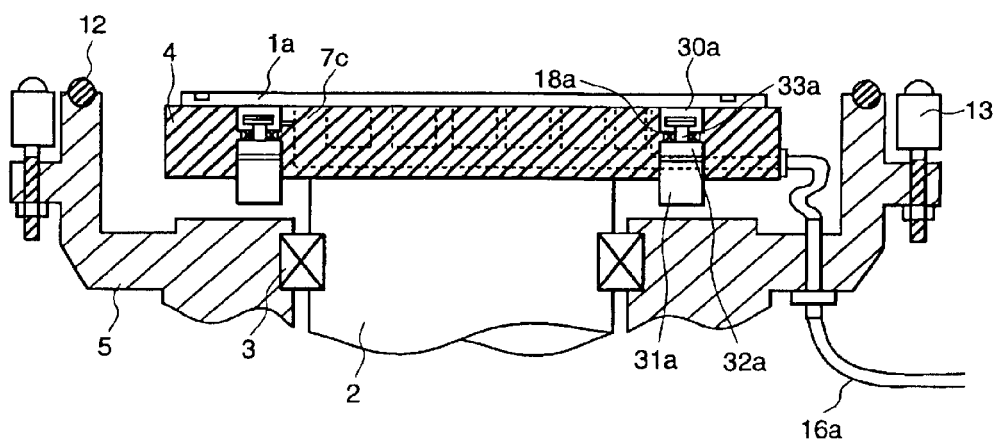
Figure 1:
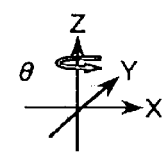

In FIG. 1, the substrate assembly apparatus 100, in accordance with the present invention, is composed of a lower chamber part T1 and an upper chamber part T2, and an XYθ-direction drive mechanism (not shown) is provided below the lower chamber part T1. With the XYθ-direction drive mechanism, the lower chamber part T1 can move freely in direction of the X axis, which is defined to be in the right-and-left direction, and in the Y axis direction, which is transverse to the X-axis direction. In addition, with the θ-direction drive mechanism, the table 4 on which the lower substrate is mounted can be moved rotationally in a vertical plane with respect to the lower chamber unit 5 through rotation of the shaft 2, which is supported via the vacuum seal 3. When the lower substrate 1a is mounted on the table 4, a suction and adsorption operation is carried out by the suction port 7c provided in the table 4. One end of a pipe 16a is connected to the suction port 7c, and a pressure reduction (negative pressure) source is connected to the other end of the pipe through a valve (not shown). What is provided is a chucking mechanism through which the lower substrate 1a is attracted and adsorbed to the suction port 7c so as to be held on table 4 with a negative pressure provided by the negative pressure source.

The upper chamber part T2 has an upper chamber unit 6 and a pressurizing plate 7, which is installed therein, and the upper chamber unit 6 and the pressurizing plate 7 are mounted so that they can move up and down independently. That is, the upper chamber unit 6 has a housing 8, including a linear bush with a vacuum seal inside, and, while being guided by the shaft 9, it can be moved in the vertical direction (in the Z-axis direction) by the cylinder 11, which is fixed to a frame 10. The pressurizing plate 7 is moved in the vertical direction (in the Z-axis direction) by a drive apparatus (not shown) provided at the shaft 9.

The upper substrate 1b is attracted and adsorbed to the suction port 7d provided on the lower face of the pressurizing plate 7. One end of the pipe 16b is connected to the suction port 7d, and the negative pressure source is connected to the other end of the pipe 16b through a valve (not shown). In this configuration, by supplying a negative pressure from the negative pressure source, the upper substrate 1b is attracted and adsorbed to the pressurizing plate 7.

As the lower chamber part T1, which is disposed above the XYθ-direction drive mechanism, moves directly below the upper chamber part T2 and the upper chamber unit 6 moves down, the flange of the upper chamber unit 6 contacts the O-ring 12 provided around the lower chamber unit 5. In this condition, those chamber units are integrated into a single unit to form a vacuum chamber. The ball bearing 13, which is provided in the periphery of the lower chamber unit 5, is used for adjusting the amount of elastic deformation of the O-ring 12 in contact with the flange of the upper chamber unit 6, which can be adjusted at arbitrary positions in the vertical and horizontal directions. The position of the ball bearing 12 is adjusted for optimizing the amount of elastic deformation of the O-ring 12, so that the pressure inside the vacuum chamber may be maintained in a given reduced pressure state and a maximum elasticity may be obtained. The large amount of force generated by reducing the pressure inside the chamber is supported by the lower chamber unit 5 through the ball bearing 13. Owing to this configuration, when laminating the upper and lower substrates, as will to be described later, the precise positioning those substrates can be established easily by fine adjustment of the lower chamber part T1, within the elastic region of the O-ring 12.

The housing 8 has a built-in vacuum seal so as to move up and down in which a way that no pressure leakage may occur even if the upper chamber unit is deformed when the pressure inside the vacuum chamber, which is formed by coupling the upper chamber unit 6 and the lower chamber unit 5, is reduced. Owing to this configuration, the force applied to the shaft 9, that is developed by the deformation of the vacuum chamber, can be absorbed, and a deformation of the pressurizing plate 7, that is supported by the shaft 9, can be prevented in general. Thus, the upper substrate 1b, that is attracted and adsorbed so as to be held on the lower surface of the pressurizing plate 7 by the adhesive member 18b, and the lower substrate 1a, that is supported by the table 4, can be laminated while their horizontal disposition is maintained. The up-and-down movement of the pressurizing plate 7 is performed by a drive mechanism, not shown, that is installed at the upper part of the shaft 9.

The vacuum pipe 14, which is installed at the side surface of the upper chamber unit 6, is connected to the negative pressure source through a vacuum valve and a pipe hose, not shown. These components are used for reducing the pressure inside the vacuum chamber to a given pressure level. A leakage valve 17 is provided for adjusting the vacuum level (reduced pressure level) inside the vacuum chamber so as to increase the pressure to an arbitrary pressure level. A gas purge valve and tube 15 is connected to a pressure source, such as a source of Nitrogen gas (N2) or clean dry air, and is used to restore the pressure inside the vacuum chamber to atmospheric pressure.

A pair of image recognition cameras 22a and 22b are installed for reading positioning markers that are provided on the upper and lower substrates 1b and 1a. Transparent view ports 23a and 23b for the image recognition cameras 22a and 22b are provided above holes 6a and 6b, that are formed in the upper chamber unit 6, in order to establish a vacuum sealing to prevent the air from flowing through the holes 6a and 6b into the chamber. Small-sized holes 7a and 7b are provided also in the pressurizing plate 7, so that the image recognition cameras can view the positioning marks formed on the substrate through those holes 7a and 7b.

Figure 2:
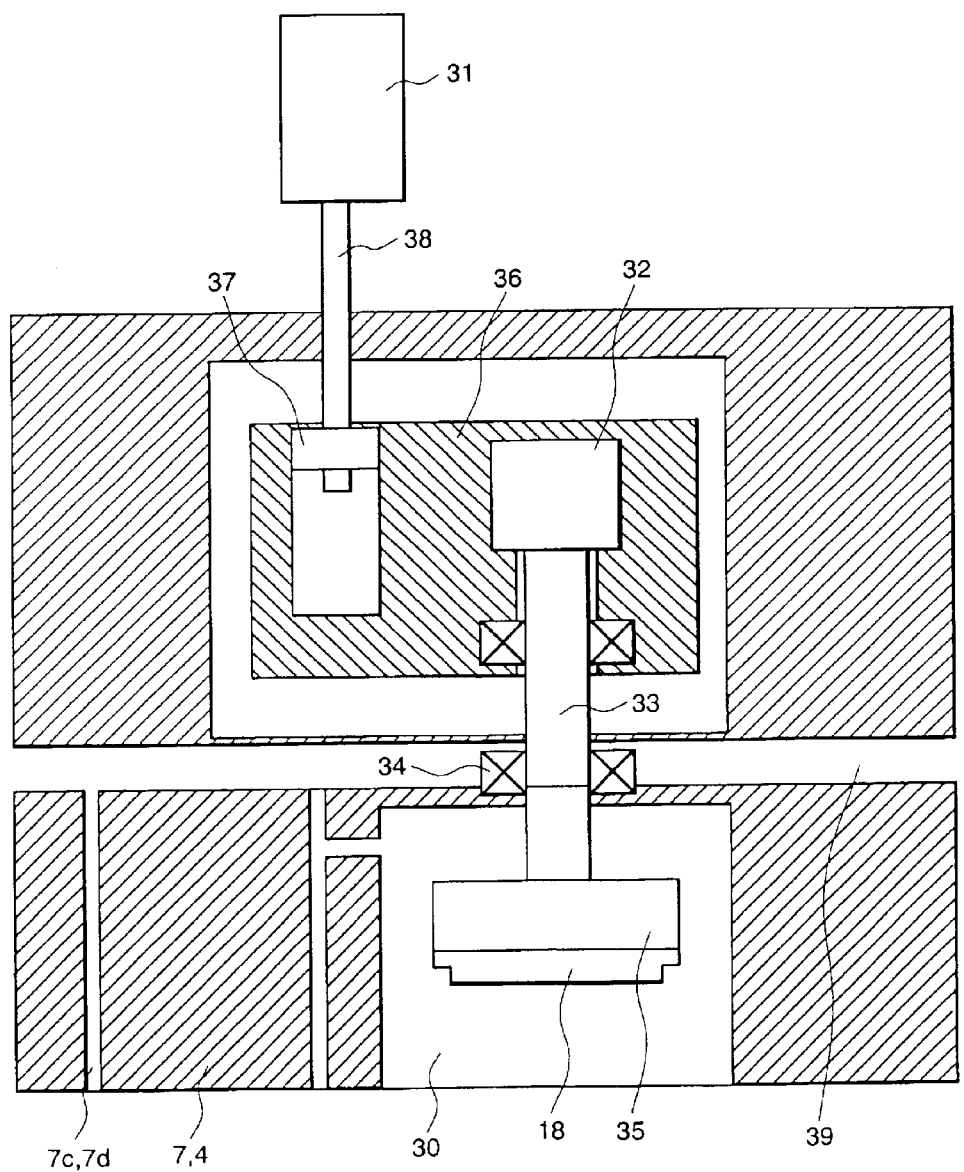
FIG. 2 is a detailed sectional view of one example of the adherence holding mechanism.

Next, referring to FIG. 1 and FIG. 2, the mechanisms of the adhesion part supporting the upper substrate 1b and its drive part will be described. FIG. 2 shows details of the structure of the adhesion and support mechanism part.

As shown in FIG. 2, an open port 30 is provided in the pressurizing plate 7 or the table 4, and a cartridge 35 carrying an adhesive member 18 is installed at one end of a rotating shaft 33, which extends inside the open port 30, and this cartridge is mounted so that it can be replaced. A rotating actuator 32 is provided at the other end of the rotating shaft 33, and the rotating actuator 32 is fixed to a movable table 36. One end of a drive shaft 38, which moves up-and-down in the vertical direction, is connected and fixed at the fixing member 37, and an actuator 31 for driving the shaft 38 up-and-down in the vertical direction is provided at the other end of the drive shaft 38. In addition, the cavity route 39, which is connected to the negative pressure source, is provided inside the pressurizing plate 7 and the table 4, and a plurality of suction ports 7d and 7c are provided so as to pass through from the cavity route 39 to the surface of the pressurizing plate 7 and the table 4. The cavity route 39 also is connected to the open port 30.

For the individual actuators 31 and 32, as shown in FIG. 1, the symbol "a" is appended to the one associated with the pressurizing plate 7 and the symbol "b" is appended to the one associated with the table 4. In response to the operation of the actuators 31b and 32b at the pressurizing plate, the adhesive member 18b moves up and down and rotates within the open port 30b. The shaft 33b is sealed by the seal 34b so as to move up and down and rotate freely, directly below the actuator 31b. The open port 30b connects to the cavity route 39b and to the negative pressure source through a valve (not shown), and, thus, a structure by which the upper substrate 1b can be attracted and adsorbed is established. Instead of connecting the open port 30b and the suction port 7d to each other within the pressurizing plate 7, as shown in the drawings, it is possible to establish such a connection by means of a channel that is formed on the surface of the pressurizing plate 7 in contact with the substrate for connecting between the open port 30b and the suction port 7d.

The upper substrate 1b can be supported so as to firmly contact the pressurizing plate 7 using the adhesive member 18b, due to its adhesive action, without causing the upper substrate to be attracted and adsorbed to the lower surface of the pressurizing plate 7 by suction. In this configuration, in order to support the upper substrate 1b so as to be horizontally opposed to the lower substrate 1a, a plurality of adhesive members 18b are provided at designated positions, with their spacing and adhesive area by set for the size and the shape of the upper substrate 1b.

In this embodiment, in which the actuator 32 for rotating the adhesive members 18b and the actuator 31 for moving the adhesive members up-and-down vertically are provided independently, it is possible for a single actuator, having those functions, to be configured by using a ball screw and like. The actuator in this embodiment can be realized either by using compressed air or by using a motor drive mechanism.

As described above, the lower substrate 1a is attracted and adsorbed by the configuration in which the lower substrate is subjected to suction via the pipe 16a, the valve and the negative pressure source, both not shown, on the table 4. In this embodiment, the adhesive members 18a are provided inside the open ports 30a in a similar configuration to that provided for the pressurizing plate 7. The actuators 31a and 32a are installed below the plurality of open ports 30a provided at the table 4. Each adhesive member 18a is provided at the top end of a shaft 33a extending upward from the actuators 31a and 32a. The adhesive member 18a moves up and down and rotates inside the open port 30a by the operation of the actuators 31a and 32a. The shaft 33a is sealed by the seal 34a in a similar manner to the shaft 33b, so as to move up and down and rotate directly below the actuator 31a. The open port 30a is connected to the suction port 7c, which is connected to the pipe 16a and the negative pressure source through a valve (not shown), and thus the upper substrate 1a can be attracted and adsorbed by suction to hold it on the table 4.

In order to support the lower substrate 1a stably, the adhesive members 18a are also provided at the table 4 at designated positions, with their spacing and adhesive area determined for the size and the shape of the upper substrate 1a. Instead of using the adhesive members 18a for fixing the lower substrate 1a on the table 4, it is also possible to use mechanical pins and rollers. In this regard, there is a reasonable rationale for fixing the lower substrate 1a by pins and rollers instead of using the attractive and adsorptive means. In the process of reducing the pressure inside the chamber, it may be difficult to fix the lower substrate 1a on the table 4 due to the pressure difference, that occurs when the vacuum level (reduced pressure level) inside the chamber exceeds the vacuum level (reduced pressure level) required for attracting and adsorbing the lower substrate 1a. In order to solve this problem, the mechanism in this embodiment to support the lower substrate 1a may involve the use of mechanical pins and rollers in order to prevent an offset of the lower substrate 1a due to vibrations generated by the excitation source, such as various drive sources originated from the apparatus itself, the floor and the negative pressure source, or the resistance generated in contacting the seal and the liquid crystal panel when laminating the upper and lower substrates.

Figure 3:
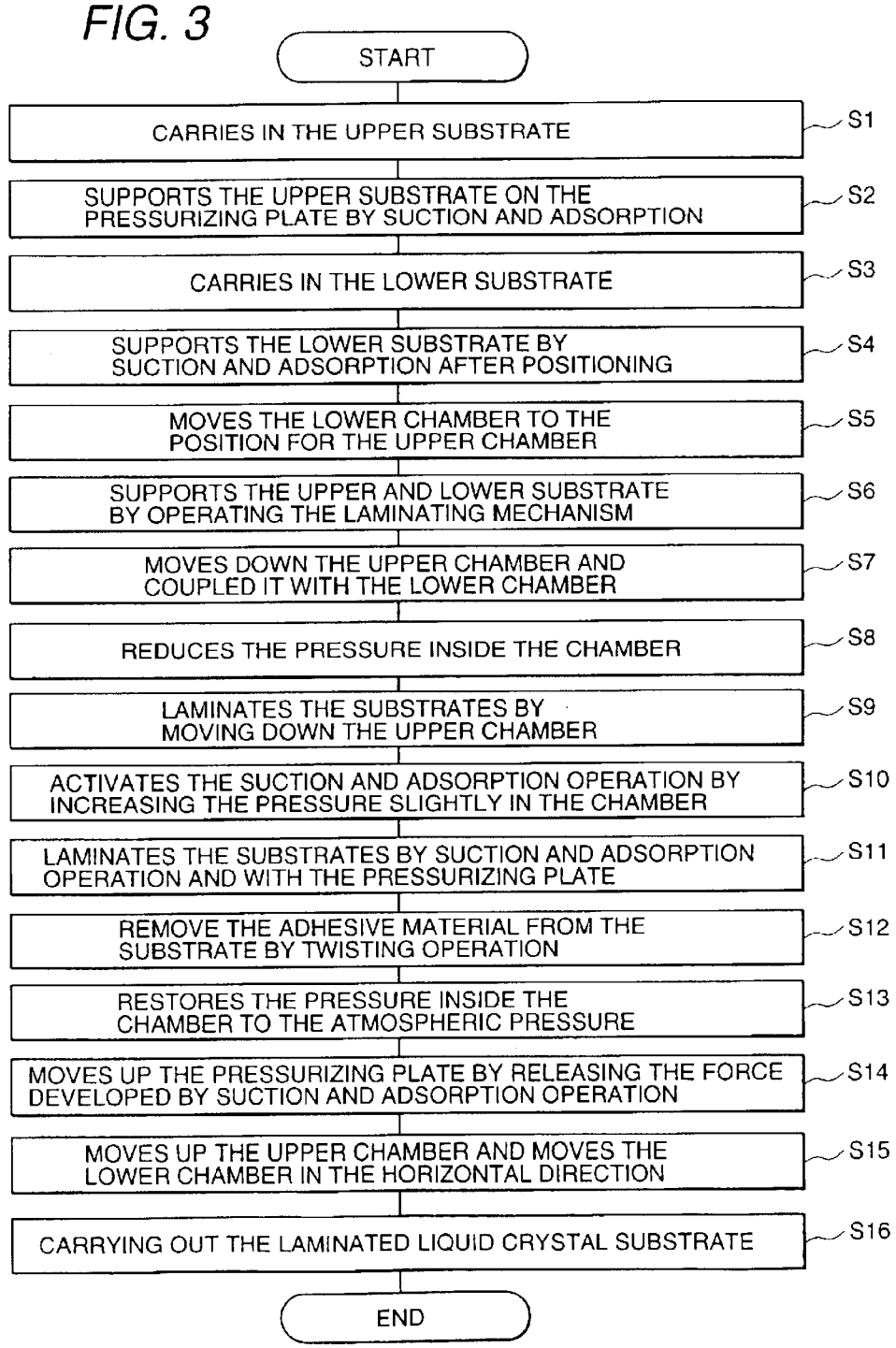
FIG. 3 is a flowchart of the process for laminating the substrates.
Figure 4A:
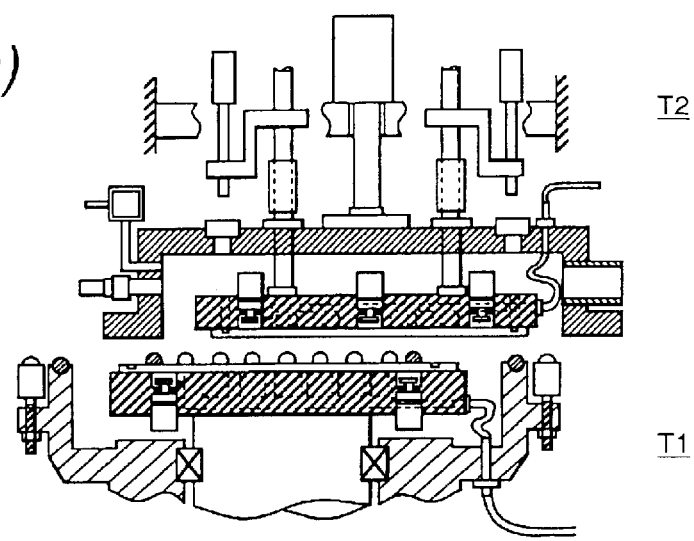
FIGS. 4(a) to 4(c) are cross-sectional views of the major part of the apparatus illustrating the process for laminating the upper and lower substrates.
Figure 4B:
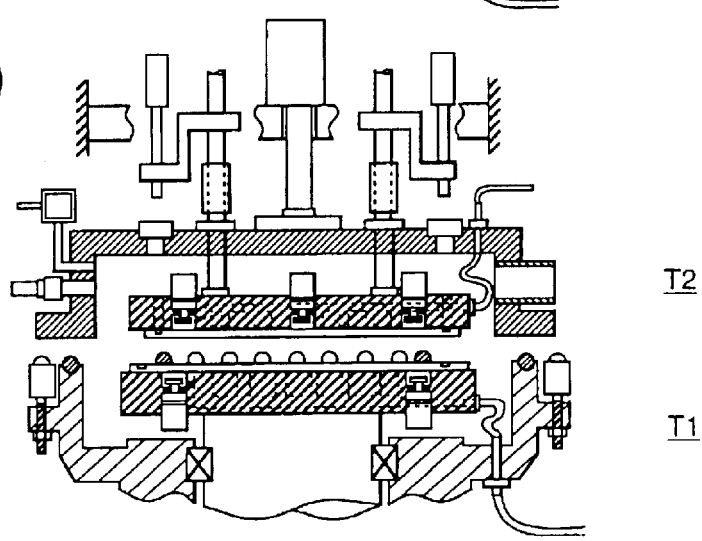
Figure 4C:
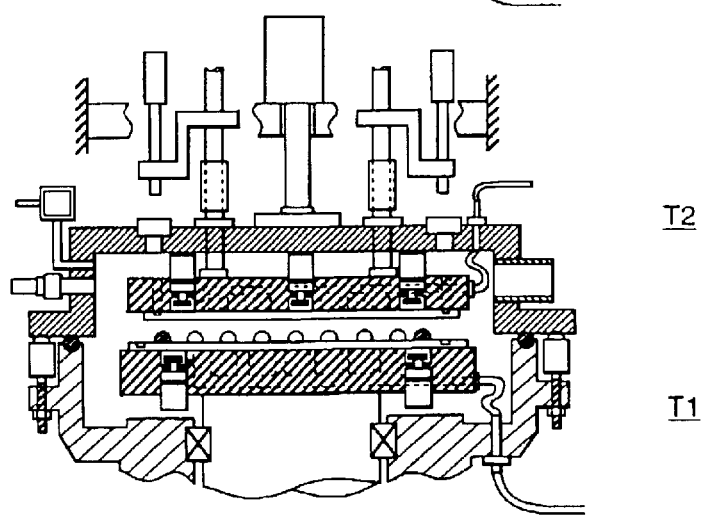
Figure 5A:
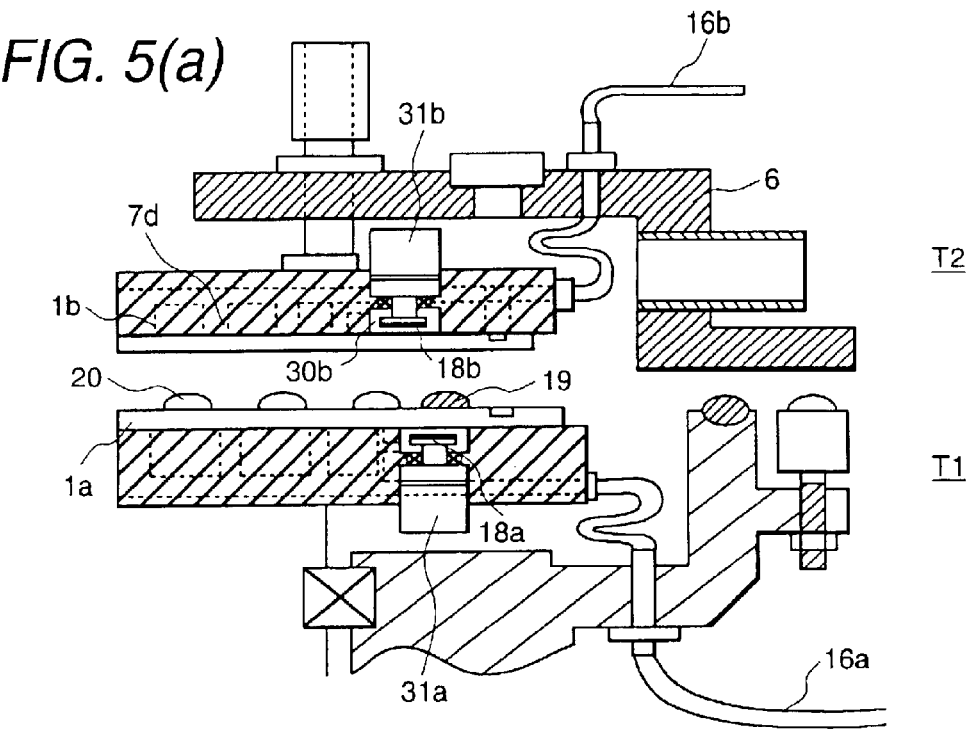
FIGS. 5(a) and 5(b) are schematic diagrams illustrating the operation of lamination performed by the adherence holding mechanism.
Figure 5B:
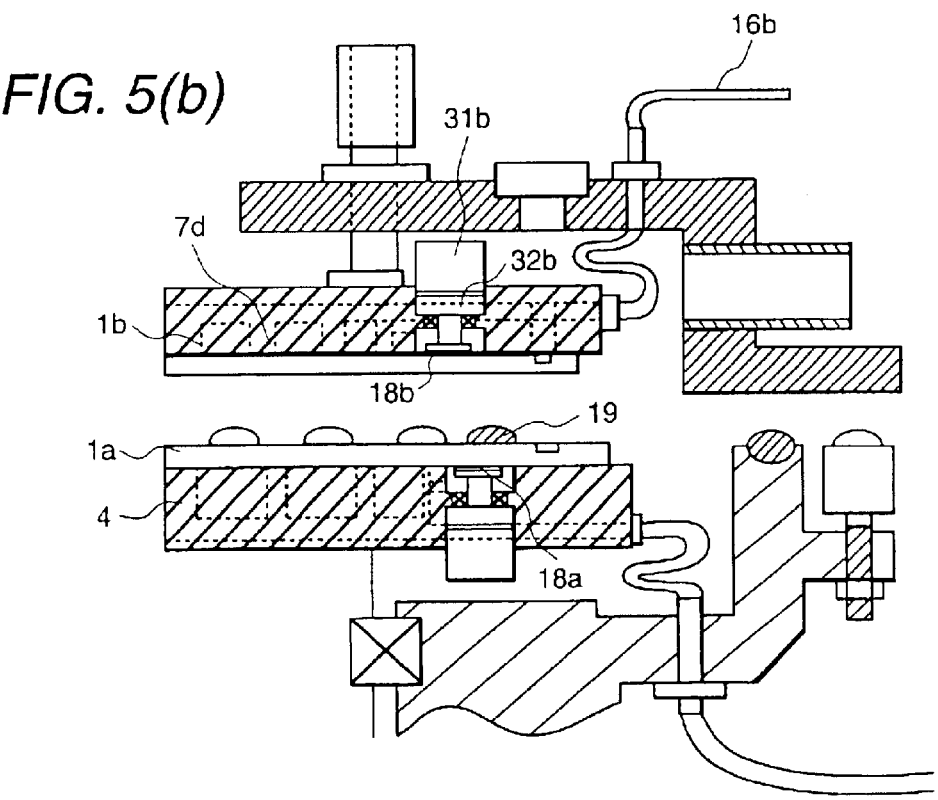
Figure 6A:
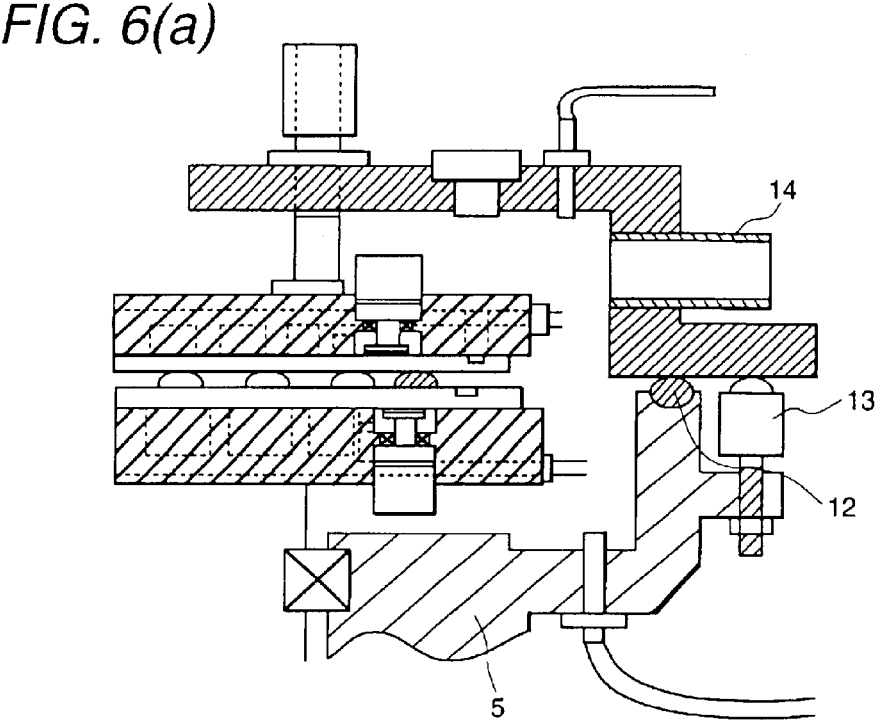
FIGS. 6(a) and 6(b) are schematic diagrams illustrating the operation of removal of the adherence holding mechanism from the surface of the substrate.
Figure 6B:
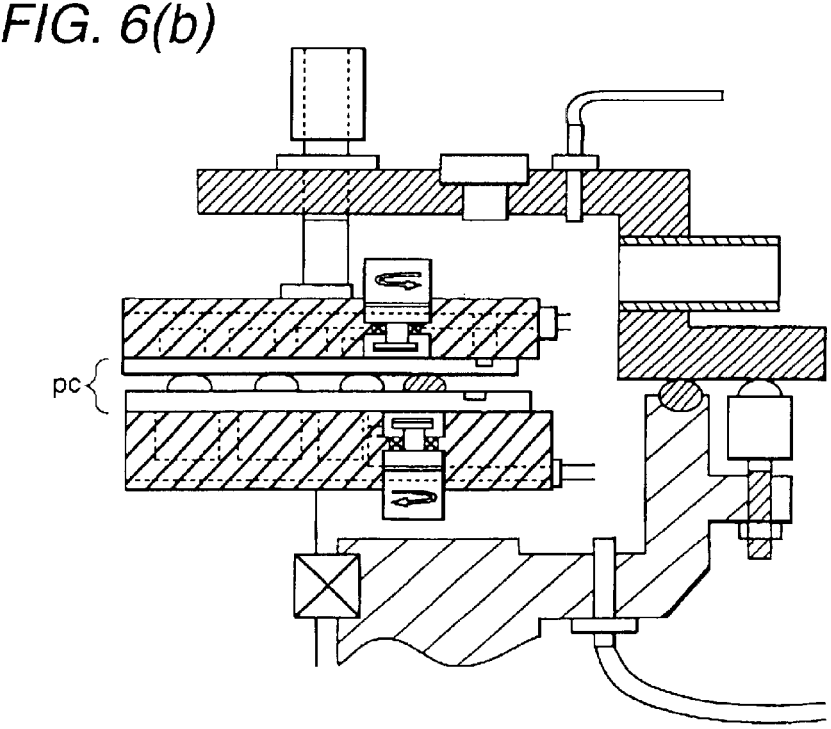

Next, referring to FIGS. 3 to 6, the procedures for manufacturing the liquid crystal display apparatus in the substrate assembly apparatus in accordance with the present invention will be described. FIG. 3 shows a flowchart of the procedures for laminating the liquid crystal substrates. FIG. 4(a) to 4(c) show the operation states of the apparatus at the individual procedural steps. FIGS. 5(a) and 5(b) show the operations of the adhesion and support mechanism in laminating the substrates. FIGS. 6(a) and 6(b) show the operation of removing the adhesion support mechanism from the surface of the substrate after the primary laminating operation.

At first, the upper liquid display substrate 1b is carried in below the pressurizing plate 7 by using a robot hand and the like (Step S1). Next, the upper liquid crystal substrate 1b is attracted and adsorbed and supported on the pressurizing plate 7 by supplying negative pressure to the attraction and adsorption port formed in the pressurizing plate 7 (Step S2). Then, the lower liquid crystal substrate 1a is carried in, above the table 4, by a robot hand or the like (Step S3); and, after positioning the lower liquid crystal substrate with respect to the table 4, the lower liquid crystal substrate 1a is fixed to the table 4 by the attraction and adsorption operation (Step S4). A sealing agent 19 is coated in a closed loop pattern on the peripheral region of the upper surface of the lower liquid crystal substrate 1a, and the liquid crystal agent 20 is quantitatively dropped inside the closed pattern. In this embodiment, although the sealing agent 19 is provided on the lower liquid crystal substrate 1a, it is also possible to provide the sealing agent on the upper liquid crystal substrate, or on both of the liquid crystal substrates. The state processing up to this step is shown in FIG. 4(a).

Subsequently, the lower chamber part T1 is moved into alignment with the position of the upper chamber part T2 (Step S5). FIG. 4(b) illustrates the state in which the lower chamber part T1 above the XYθ-direction drive mechanism moves to the position directly below the upper chamber part T2, so that and the lower liquid crystal substrate 1a and the upper liquid crystal substrate 1b are positioned opposite to each other. As described above, the upper liquid crystal substrate 1b is supported by the attraction and adsorption operation of the suction port 7d with respect to the pressurizing plate 7. In addition, as the open port 30b is also connected to the negative pressure source in this configuration, the upper liquid crystal substrate is also attracted and adsorbed by the suction applied to the open port 30b.

At this time, the surface of the upper liquid crystal substrate 1b and the adhesive member 18b are spaced apart from each other, as shown in FIG. 5(a), and the airspace between the adhesive surface of the adhesive member 18b and the upper liquid crystal substrate 1b is in a designated reduced pressure (vacuum) state. Starting from this state, as shown in FIG. 5(b), the adhesive member 18b is moved toward the surface of the upper liquid crystal substrate and becomes attached to the upper liquid crystal substrate 1b by the operation of the actuator 31b (Step S6). Thus, when the adhesive member 18b comes into contact with the upper liquid crystal substrate 1b, the airspace formed between the open port 30b and the surface of the substrate is in a pressure reduced state owing to the suction provided by the vacuum tube 16b used for the attraction and adsorption operation. Thus, it will be appreciated that a designated adhesive force can be established even by reducing the pressure inside the vacuum chamber without the air penetrating between the substrate and the adhesive member. For example, as the pressure inside the vacuum chamber is reduced, in the case where air penetrates between the substrate and the adhesive member, without reducing the pressure in the airspace between the open port 30b and the surface of the substrate, the airspace between the substrate and the adhesive member expands. This causes the adhesive force to decrease, with the result that the substrate can not be properly attracted and supported.

This operation is also applied between the lower liquid crystal substrate 1a and the adhesive member 18a almost at the same time (Step S6); however, since the lower liquid crystal substrate 1a is supported above the table 4 in the direction of the gravitational force, it is possible to support the lower liquid crystal substrate by the use of mechanical pins and rollers, instead of using the adhesive members 18a.

Thus, after fixing the upper and lower substrates 1b and 1a, the upper chamber unit 6 is moved downward by the cylinder 11, as shown in FIG. 4(c); and then, by bringing the flange of the upper chamber unit 6 into contact with the O-ring 12 that is arranged around the periphery of the lower chamber unit 6, the upper and lower chamber parts T1 and T2 are integrated into a single body (Step S7). Then, the air inside the chamber is exhausted through the vacuum pipe 14.

As the pressure inside the vacuum chamber that has been formed by integrating the upper chamber unit 6 and the lower chamber unit 5 decreases, the difference between the pressure reduction level for attracting the upper liquid crystal substrate 1b to the pressurizing plate 7 and the pressure reduction level inside the vacuum chamber gets smaller, and the attraction and adsorption force provided by the pressurizing plate 7 disappears, however the upper liquid crystal substrate 1b does not come loose because it is supported by the adhesive member 18b.

In this state, since the air does not penetrate between the adhesive surface of the adhesive member 18b and the upper substrate 1b, the fixing state can be maintained without the adhesive force being changed. Thus, there is no problem of the adhesive force being reduced due to the expansion of the air in the process of reducing the pressure, which would cause the upper liquid crystal substrate 1b to come loose. As for the lower liquid crystal substrate 1a, in which the adhesive surface of the adhesive member 18a and the lower liquid crystal substrate 1a are fixed adhesively to each other without any air between them, the adhesive force does not decrease due to the expansion of the air, and the displacement of the upper liquid crystal substrate 1b does not occur.

When the pressure inside the vacuum chamber reaches a designated vacuum level, as shown in FIG. 6(a), the pressurizing plate 7 is moved downward by operating the up-and-down drive mechanism on the shaft, not shown, while positioning the upper and lower substrates 1b and 1a. The operation of the up-and-down drive mechanism can generate an applied pressure having a sufficient intensity to enable the upper liquid crystal substrate 1b to firmly contact or squeeze the sealing agent 19 that has been coated in a closed loop pattern on the peripheral region of the upper surface of the lower liquid crystal substrate 1a. Thus, the upper and lower liquid crystal substrates 1b and 1a are laminated with a designated gap (Step S9). FIG. 6(a) shows a magnified view of this state. At this step, the lower liquid crystal substrate 1a and the upper liquid crystal substrate 1b are laminated firmly with the sealing agent 19. Thus, in this configuration, even if the pressure inside the vacuum chamber is increased, the air tightness of the space inside the closed sealing pattern can be maintained at a certain level; and, consequently, the amount of the air penetrating into the space between the finished laminated liquid crystal substrates becomes extremely small.

Next, a small amount of air is introduced into the vacuum chamber through the leakage valve 17; the pressure inside the vacuum chamber is increased to a designated reduced pressure level higher than the negative pressure inside the suction port 7d and the support of the upper and lower liquid crystal substrates is established by the pressure difference between them (Step S10). A further positioning operation is performed by using this supporting force, and the applied pressure is generated by the pressurizing plate 7, so that a designated final pressuring force is attained (Step S11). This operation is required because the substrates may be displaced due to the resistance of the liquid crystal and the sealing agent when applying the pressure, if the additional positioning operation is not performed in the pressuring process after the upper substrate 1b contacts to the sealing agent 19.

In positioning the substrates, their positions are measured by reading the positioning markers formed on the upper and lower substrates though the view ports 23a and 23b that are formed in the upper chamber unit 6 using the image recognition cameras 22a and 22b and by image processing, and a high precision positioning is performed by fine operation of the XYθ-direction drive mechanism, not shown, at the table 4, which supports the lower chamber part T1. In this fine adjustment, the gap between the upper chamber unit 6 and lower chamber unit 5 is maintained to a designated distance by the ball bearing 13, so that the O-ring 12 may not be deformed extremely and a designated reduced pressure level may be established.

The operation of removing the adhesive members 18b and 18a from the upper liquid crystal substrate 1b and lower liquid crystal substrate 1a, after laminating the substrates, is performed as shown in FIG. 6(b). For the upper liquid crystal substrate 1b, by rotation the actuator 32b in the direction shown by the arrow and operating the actuator 31b, while or after twisting the adhesive member 18b, the adhesive member 18b is lifted up from the surface of the substrate. For the lower liquid crystal substrate 1a, in a similar manner, by rotating the actuator 32a in the direction shown by the arrow and operating the actuator 31a, while or after twisting the adhesive member 18a, the adhesive member 18a is lifted up from the surface of the liquid crystal substrate (Step S12). This twisting operation is necessary, since it makes it easier to remove the adhesive member from the liquid crystal substrate. The twisting operation also may be in the direction opposite to that shown in FIG. 6(b). When lifting up the adhesive members, the peripheral parts of the individual open ports 30a and 30b block the movement of the liquid crystal substrates 1b and 1a. Thus, the twisting operation and lifting-up operation make it possible to easily remove the adhesive members from the liquid crystal substrate.

Subsequently, the inside of the vacuum chamber is purged and its internal pressure is restored to the atmospheric pressure by introducing Nitrogen gas ($N_2$) or clean dry air and like into the vacuum chamber by opening the gas purge valve 15 (Step S13), and the pressurizing plate 7 is moved up after releasing the attracting operation of the suction port 7d for the liquid crystal substrate (Step S14). Next, the upper chamber unit 6 is moved up and the lower chamber part T1 is moved to its initial position (shown in FIG. 4(a)) (Step S15), and then the laminated cell pc is extracted out from the table 4 (Step S16). The upper and lower surfaces of the laminated upper and lower substrates, that is the cell pc, is uniformly pressed by the environmental atmospheric pressure, and the gap between them reaches a designated cell gap precisely. At the end of the above procedural steps, the laminating operation for the substrates is completed.

After the gap between the substrates reaches a designated cell gap in response to the atmospheric pressure, the laminating work is finished by hardening the sealing agent by exposing the sealing agent to light. There is an alternative way of temporarily fixing the sealing agent, which involves exposing it to light after completing the mechanical pressurizing operation (after completing Step S12). In this embodiment, in which the substrate is supported by the adhesive member after moving the lower chamber part T1, it is possible to perform this operation before moving the lower chamber part. In addition, as for the operation for removing the adhesive members from the surfaces of the substrates, it is possible to perform this operation after restoring the pressure inside the vacuum chamber to atmospheric pressure.

In the embodiment described above, the operation for removing the adhesive member at the pressurizing plate is performed after completing the final phase of pressuring by the pressurizing plate. In the alternative, it is possible, after applying a preliminary press operation to the substrates in such a state that the substrates can not be supported by attractive and adsorptive operations (only supported by contacting the adhesive members to the substrates), to apply the final pressure along with the positioning of the substrates by using the pressurizing plate, after removing the adhesive members from the surface of the substrate and while twisting the adhesive members in the state where the substrate is supported by attractive and adsorptive operations, by increasing the pressure inside the chamber.

Figure 7:
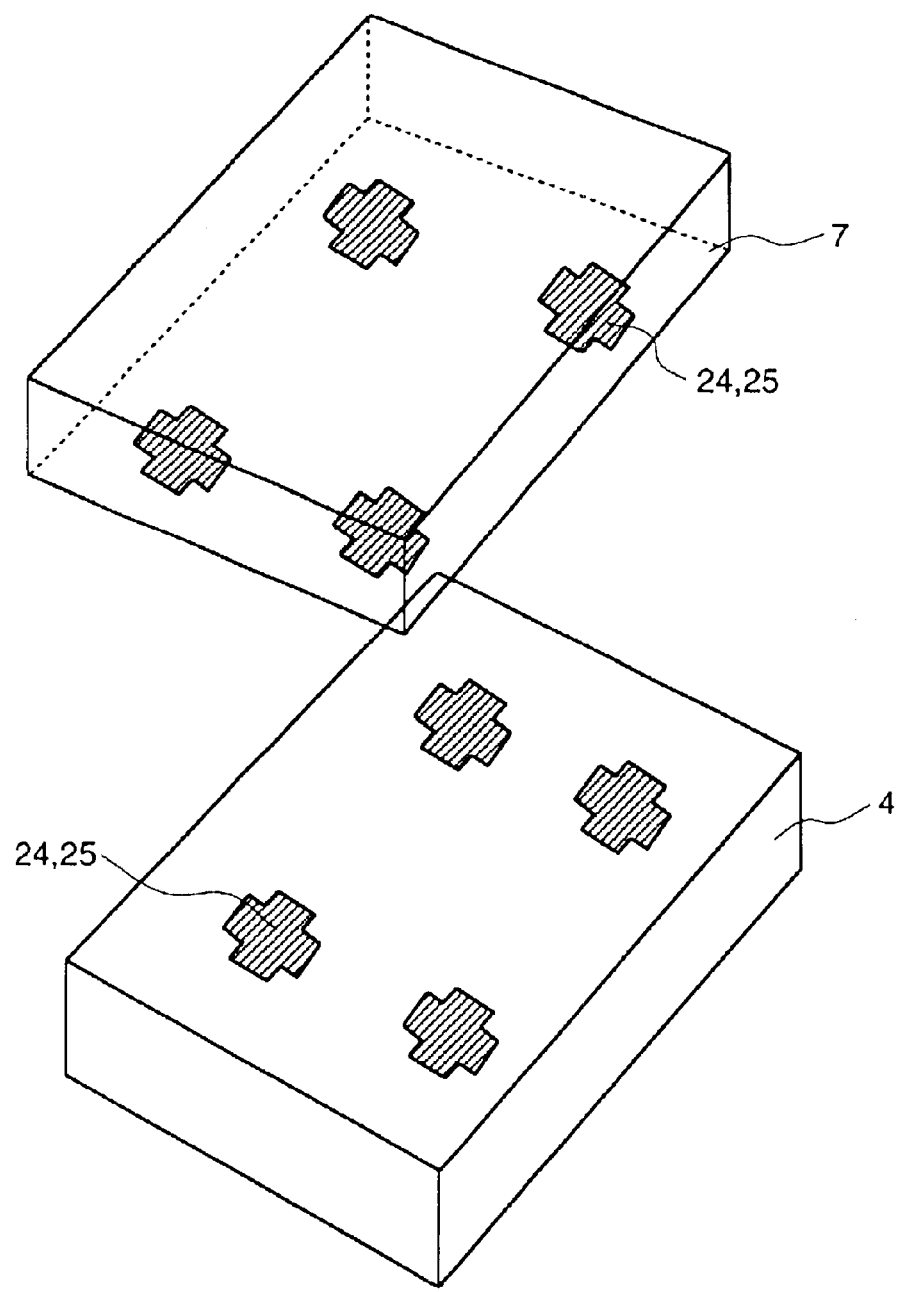
FIG. 7 is a diagram showing an example of the case in which enhanced abrasive member is provided at the pressurizing plate and the table.

Next, referring to FIGS. 6(a), 6(b) and 7, a method of manufacture of the liquid crystal display apparatus in accordance with another embodiment of the present invention will be described.

In this embodiment, after setting the upper and lower liquid crystal substrates onto the pressurizing plate and the table, respectively, in a similar way to that employed in the previously described embodiment, the pressure inside the vacuum chamber is reduced to a designated reduced pressure level. Then, as described with reference to FIG. 6(a), the pressurizing plate 7 is moved down by operating the up-and-down drive mechanism, not shown, on the shaft 9 while positioning the upper and lower substrates 1b and 1a. The upper liquid crystal substrate 1b is moved toward the lower liquid crystal substrate 1a until it firmly contacts or squeezes the sealing agent 19 that was coated in a closed loop pattern on the peripheral region of the upper surface of the lower liquid crystal substrate 1a. In the previously described embodiment, after this operation, the pressure inside the vacuum chamber was increased to a designated reduced pressure level higher than the negative pressure inside the suction port 7d, and the support of the upper and lower liquid crystal substrates was established by the pressure difference between them; and, finally, the applied pressure was generated by the pressurizing plate 7, while the positioning operation was performed and a designated final pressuring force was attained.

However, in this embodiment, the pressure difference due to increasing the pressure inside the vacuum chamber is not used. In this embodiment, as shown in FIG. 7, resin 24 or rubber 25 materials having a large friction coefficient are formed partially on the surfaces of the pressurizing plate 7 and the table in contact with the substrates. When applying the positioning and pressurizing operations, the sliding motion of the liquid crystal substrates 1a and 1b in the vertical direction relative to the pressurizing plate 7 and the table 4 is prevented by the friction force provided by the members 24, 25. Owing to this configuration, in the state where the pressure inside the chamber is not increased, but is kept at its reduced pressure level, finally, the applied pressure is generated by the pressurizing plate 7, while the positioning operation is performed and a designated final pressuring force is attained. The resin 24 or rubber 25 material may be formed on the whole surface area of the contacting surface of the pressurizing plate and the table. For simplicity of explanation, the suction port, the open port, the adhesive member and their surrounding area are not shown in FIG. 7.

The operations which are performed when and after the adhesive members are removed individually from the laminated upper and lower substrates are the same as those in the previously described embodiment.

The present invention is not limited to the above-described embodiment, but may be implemented in the following manner.

(1) In the configuration of the above embodiment, the adhesive surface of the adhesive members 18b and the upper liquid crystal substrate 1b can be laminated without air being inserted between them. This configuration need not be used, but it is possible for one or more suction and adsorption ports for attracting the liquid crystal substrate to be provided also at the adhesive surface of the adhesive members 18b; whereby, after bringing the adhesive surface into contact with the liquid crystal substrate and supporting those components with the attracting adsorbing operations in the atmospheric pressure state, in order to prevent the liquid crystal substrate from falling down, the expanded air between the adhesive surface and the substrate is extracted promptly when it is generated in the process of reducing the pressure by the attracting and adsorbing means of the adhesive surface. In this case, the open port 30b is connected to the inside of the vacuum chamber. The configuration for the lower liquid crystal substrate 1a is the same as that described above. In addition, it is possible for the open port 30b to be not connected to the suction port 7d, but connected to another negative pressure source.

(2) As for an alternative the method (1), it is possible for the adhesive surface of the adhesive member 18b to be formed as a concave and convex surface in order to prevent the air from staying in the convex part of the adhesive surface when laminating the substrates in the atmospheric pressure state, whereby the expanded air staying between the convex part of the adhesive surface and the liquid crystal substrate, which is generated in the process of reducing the pressure, is released promptly from the concave part into the inside of the vacuum chamber in order to prevent the upper liquid crystal substrate from falling down. In this case, the open port 30b is connected to the inside of the vacuum chamber. The configuration of the lower liquid crystal substrate 1a is the same as that described above.

(3) It is possible for the function of the suction port to be implemented by dimples formed on the surface of the pressurizing plate 7 or the table 4 in order to attract and adsorb the individual liquid crystal substrates by using the channels formed between the dimples.

Next, referring to FIG. 8, another embodiment of the present invention will be described.

In FIG. 1, a substrate supporting mechanism comprising a plurality of adhesive parts and driving parts was provided in the pressurizing plate 7 or the table 4. In contrast, in the configuration shown in FIG. 8, the adhesive parts forming the substrate supporting mechanism are provided on the whole surface of the pressurizing plate 7 and the table 4. In addition, in this configuration, in order to remove the adhesive members provided on the whole surface of the pressurizing plate 7 and the table 4, a plurality of adhesive member removing mechanisms for removing the adhesive members from the substrate are provided so as to extend toward the surface of the adhesive members which are in contact with the surface of the substrate. The substrate supporting mechanism according to this embodiment will be described in more detail below.

The substrate supporting mechanism at the table 4 in this embodiment comprises an iron plate 41a and an adhesive sheet 42a, which serves as an adhesive member that fixed and bonded on the iron plate. In the following description, the substrate supporting mechanism also will be referred to as a laminating and supporting mechanism. A suction port 7c is provided in the table 4, and this suction port 7c is provided so as to extended at a plurality of locations through the iron plate 41a and the adhesive sheet 42a of the substrate supporting mechanism. The lower substrate 1a is loaded on the substrate supporting mechanism provided on the table 4. The loaded lower substrate 1a is attracted and adsorbed by the suction provided at the suction ports 7c, which extend through the adhesive sheet, so that the substrate is fixed adhesively on the adhesive sheet 42a. One end of the pipe 16a is connected to the suction ports 7c and the other and of the pipe is connected to the reduced pressure (negative pressure) source through a valve, not shown. In this configuration, the lower substrate 1a is attracted and adsorbed to the table 4 by suction applied to the suction ports 7c from the negative pressure source.

The previously described substrate supporting mechanism is positioned by pressing one end of the iron plate 42a onto the stopper 44a that is provided on one end surface of the table 4, and its position is maintained by a press screw 45a, which is mounted on a bracket 44a at the other end of the table 4, so as to press against the other end of the iron plate 41a. A plurality of magnets 43a are provided inside the table 4, and the iron plate 41 is adsorbed and supported by the magnetic force provided by these magnets. In this configuration, the substrate supporting mechanism is supported on the table 4 by the magnetic force of the magnets and the force of the press screw 45a.

The substrate supporting mechanism for the pressurizing plate is provided on the surface of the pressurizing plate 7 facing the table 4. This substrate supporting mechanism has an iron plate 41b mounted on the pressurizing plate 7, similar to that provided for the table 4, and it has the adhesive sheet 42b mounted on the iron plate 41b, similar to that provided for the table 4.

The suction port 7d for attraction and adsorption is provided in the pressurizing plate 7, and the suction port 7d extends at plural locations through the iron plate 41b and the adhesive sheet 42b of the substrate supporting mechanism. The upper substrate 1b is attracted and adsorbed to the suction ports 7d provided on the lower surface of the adhesive sheet 42b. One end of the pipe 16b is connected to the suction port 7d, and the negative pressure source is connected to the other end of the pipe 16b through a valve, not shown. In this configuration, by supplying a negative pressure from the negative pressure source to the suction port 7d, the upper substrate 1b is attracted and adsorbed to the surface of the adhesive sheet 42b and is fixed adhesively thereto.

In a similar to the previously described case for the table 4, the substrate supporting mechanism is positioned and supported by a plurality of magnets 43b that are arranged inside the pressurizing plate 7, the stopper 44b for positioning the substrates, and the pressurizing plate 7 by the press screw 45b for pressing the end surface of the iron plate 41b through the bracket 46b provided at the pressurizing plate 7.

A plurality of removing mechanisms are provided on the table 4 and the pressurizing plate 7 in order to remove the adhesive sheets 42a and 42b from the surface of the substrates. Those removing mechanisms comprise the press shafts (press member) 48a and 48b, and the actuators 47a and 47b for forming the drive mechanism for driving the press shafts in the vertical direction. In this configuration, the open ports 30a and 30b, in which the press shafts 47a and 47b move, are connected to the fluid channels of the suction ports 7c and 7d, and thus, attractive and adsorptive forces may be developed at the open ports 30a and 30b. Instead of connecting the open port 30b and the suction port 7d to each other inside the pressurizing plate 7, as shown in the figure, it is possible for a channel bridging the open port 30b and the suction port 7d to be formed on the surface of the pressurizing plate 7, contacting the substrate, in order to connect the open port 30b and the suction port 7d to each other. In case the attracting and adsorbing operations by the open port 30b and the pressurizing and separating operations are not applied, it is possible to extend the open port 30b outside the pressurizing plate 7, instead of sealing it with the seal 34b, in order to make the pressure inside the open port 30b equivalent to the pressure inside the chamber.

The upper substrate 1b can be supported firmly on the lower surface of the adhesive sheet 42b due to its adhesive action, without attracting and adsorbing the substrate on the lower surface of the pressurizing plate 7. The adhesive sheets 42b are provided with their spacing and adhesive area determined for the size and the shape of the upper substrate 1b so as to support the upper substrate 1b horizontally while facing the lower substrate 1a. In this embodiment, the lower substrate 1a has the same structure with respect to the table 4 as described above.

Figure 9:
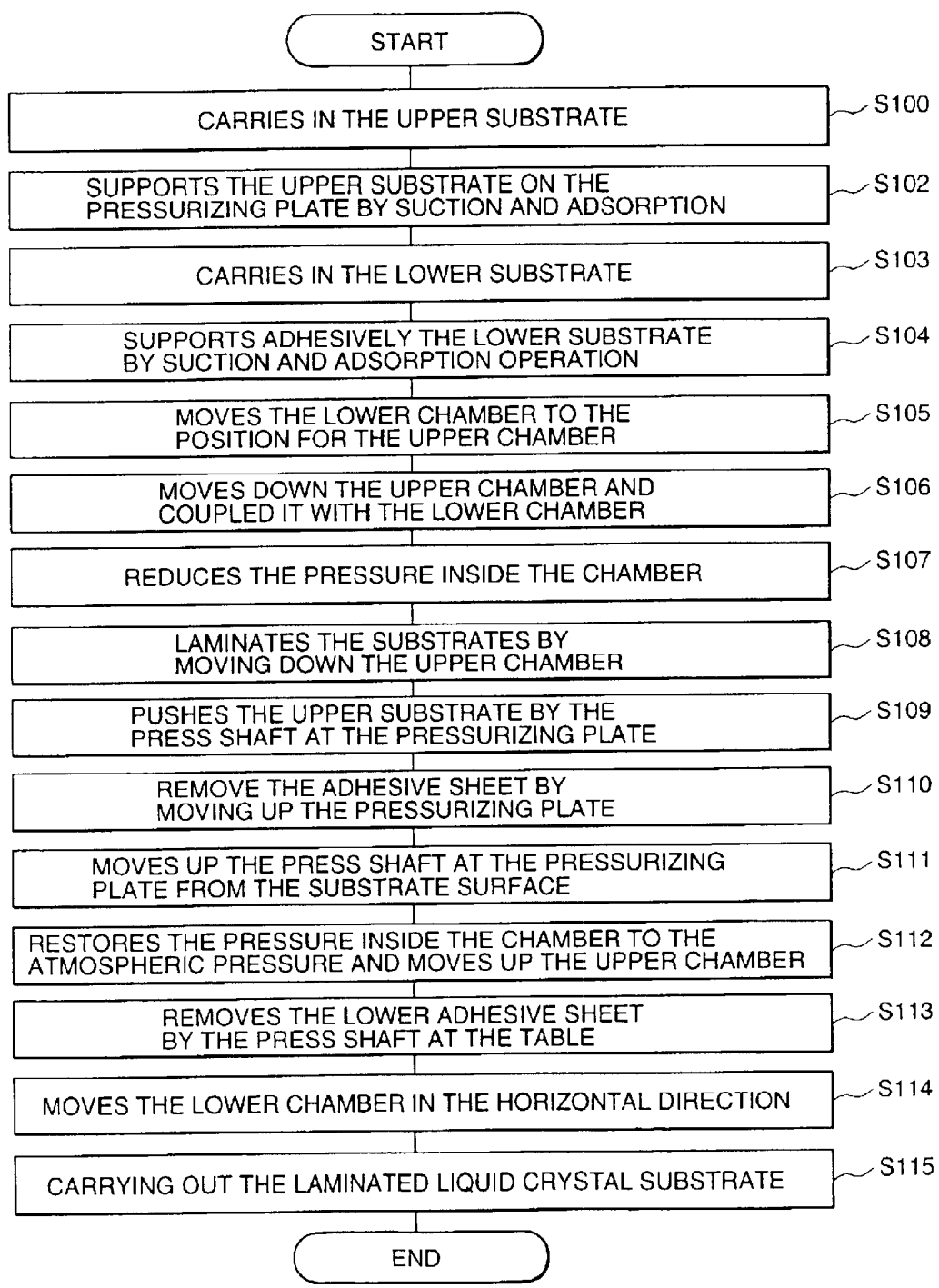
FIG. 9 is a flowchart of the procedural steps of the laminating operation employed in the apparatus shown in FIG. 8.

Next, referring to FIG. 9, the process for manufacturing the liquid crystal display apparatus will be described. FIG. 9 shows a flowchart of laminating procedures. At first, the upper liquid display substrate 1b is carried in by using a robot hand and the like (Step S100), and it is supported by the adhesive action and the attracting and absorbing operations at the adhesive sheet 42b below the pressurizing plate 7 (Step S102). Since the substrate is attracted and adsorbed by applying negative pressure to the suction port, as well as being supported by the adhesive action of the adhesive sheet 42b, the probability that an airspace remains between the liquid crystal substrate and the adhesive sheet, owing to the negative pressure provided for the suction work, may be reduced in comparison with the case in which the substrate is supported only by the adhesive action, without employing the attracting and adsorbing operations. In case that the pressure of the circumferential region of the liquid crystal substrate is reduced, while any airspace remains between the liquid crystal substrate and the adhesive sheet, the airspace remaining between the adhesive sheet 42b and the upper liquid crystal substrate 1b may expand; and, hence, there is a potential that the reduced adhesive force may cause the upper liquid crystal substrate 1b to separate from its support and fall down.

In the previously described embodiment, the surface of the adhesive sheet contacting the liquid crystal substrate is made flat. In order to further increase the security for preventing the upper liquid crystal substrate from falling down, convex and concave parts or channels are formed in the region on the surface of the adhesive sheet so that they are broader than the area of the liquid crystal substrate in order to prevent an increase of the remaining airspace, due to the negative pressure applied onto the adhesive surface, and it is possible to form the convex and concave parts so that the contained air may be released outside the substrate through the convex part of the adhesive surface, even if there is a remaining airspace and the remaining airspace may expand due to the pressure reduction in the circumferential area. In one method for implementing this configuration, the suction port for attracting and adsorbing the liquid crystal substrate is formed on a convex surface. In another method for implementing this configuration, by making the region for convex and concave parts and channels slightly smaller than the periphery of the substrate and by forming the suction port on the concave surface in order to extract the air from the concave surface, it will be appreciated that the liquid crystal substrate can be prevented from falling down. In this case, it is more effective when the suction port is formed on the convex surface, which makes it possible to suck the expanded air remaining in the convex surface from the convex surface as well as from the concave surface.

The lower liquid crystal substrate 1a is also carried in by a robot or like (Step S103) and is fixed to the adhesive sheet 42a located above the table 4 due to the adhesive action and the vacuum adsorbing operation (Step S104). In this embodiment, the liquid crystal agent 20 is dropped on the lower liquid crystal substrate and the adhesive agent 19 for sealing the circumferential area is coated on the lower liquid crystal substrate. As there is a possibility that the airspace remaining between the adhesive sheet 42a and the lower liquid crystal substrate 1a may expand and the lower liquid crystal substrate 1a may be displaced in case the pressure at the circumferential area of the liquid crystal substrate is reduced, the convex and concave parts and the channels are formed on the adhesive sheet in a similar manner to the case for the upper liquid crystal substrate 1b. Since the lower liquid crystal substrate 1a is located above the table 4 in the direction of the gravitational force, it is possible to fix the lower liquid crystal substrate 1a with mechanical pins or rollers, instead of using the adhesive sheet 42a. In this embodiment, in which the adhesive agent 19 is coated on the lower liquid crystal substrate 1a, it is possible to coat the adhesive agent 19 on the upper liquid crystal substrate 1b.

Figure 8:
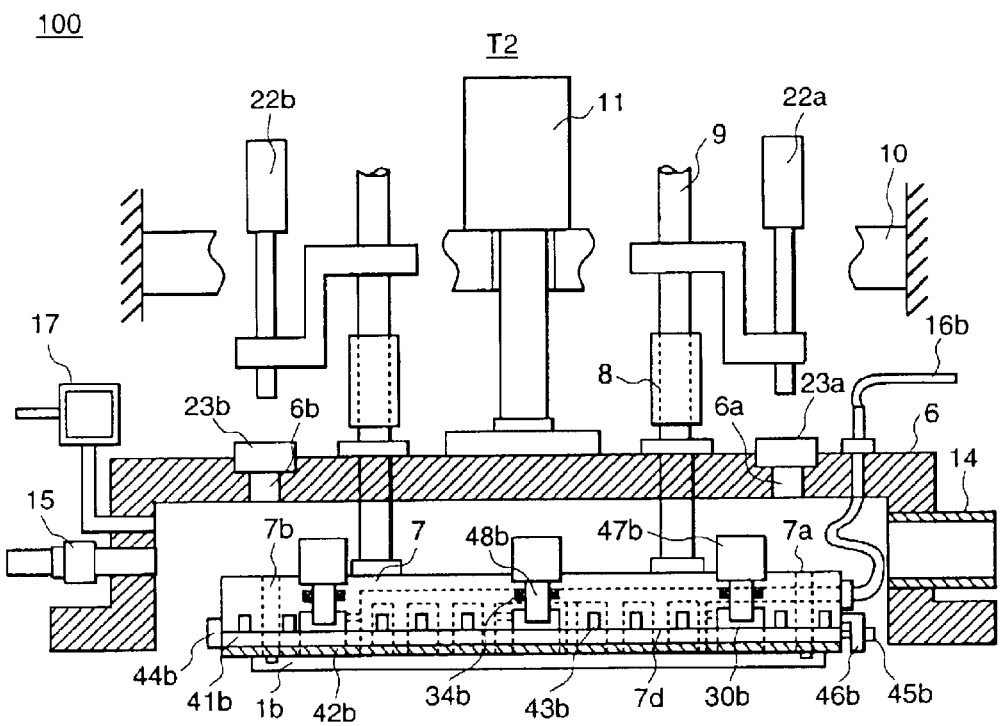
FIG. 8 is a cross-sectional view of the substrate laminating apparatus according to another embodiment of the present invention.
Figure 8:
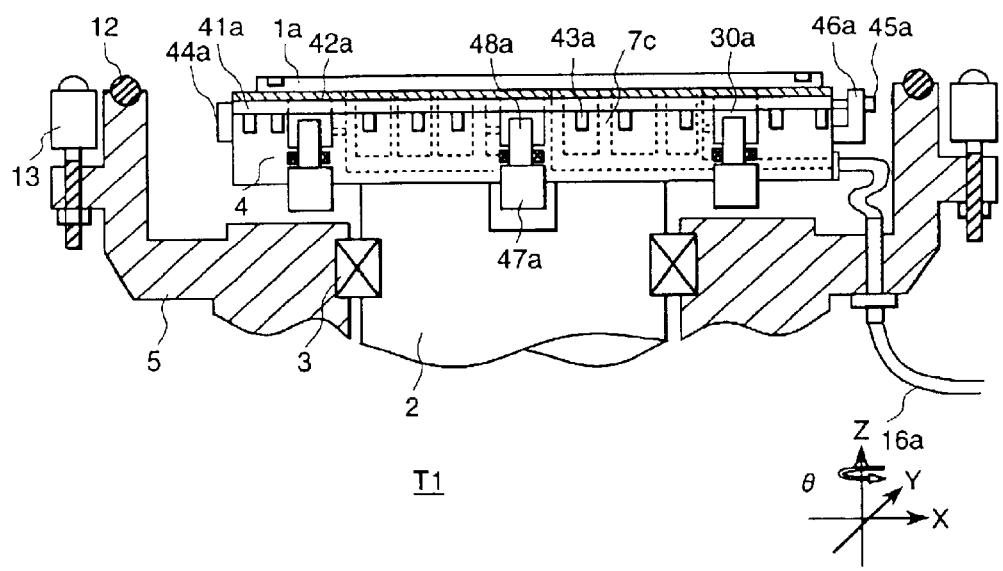

As shown in FIG. 8, starting from the state at the end of Step S104, the lower chamber part T1 above the XYθ-direction drive mechanism moves to a position directly below the upper chamber part T2 (Step S105). The lower liquid crystal substrate 1a and the upper liquid crystal substrate 1b are in position to face each other, and the cylinder 11 moves the upper chamber unit 6 down until the flange of the upper chamber unit 6 contacts the O-ring 12 that is arranged at the periphery of the lower chamber unit 5, so that, finally, the upper and lower chamber units T1 and T2 are integrated into a single body (Step S106). Then, the pressure inside the chamber is reduced, and the exhausted air is led out through the vacuum pipe 14. (Step S107). As the pressure inside the vacuum chamber, which is formed as a single body with the upper chamber unit 6 and the lower chamber unit 5 integrated together, is reduced, the difference between the reduced pressure level for adsorbing the upper liquid crystal substrate 1b at the pressurizing plate 7 and the reduced pressure level inside the vacuum chamber becomes small, with the result that the attracting and adsorbing action at the pressurizing plate 7 disappears. However, the adhesive sheet 42 supports the upper liquid crystal substrate 1b adhesively. In this regard, as above described, since convex and concave surfaces and channels are formed on the adhesive surface of the adhesive sheet 42b, there never occurs such a problem as the reduction of adhesive force or a dropping of the upper liquid crystal substrate 1b due to air expansion in the pressure reduction operation. In addition, as above described, since convex and concave surfaces and channels are also formed on the adhesive surface of the adhesive sheet 42a for the lower liquid crystal substrate 1a, there never occurs such a problem as the reduction of adhesive force or the displacement of the lower liquid crystal substrate 1a due to air expansion in the pressure reduction operation.

Now that the pressure inside the vacuum chamber has reached a designated reduced pressure level, the pressurizing plate 7 is moved down by operating the up-wand-down drive mechanism, not shown, on the shaft 9, while positioning the upper and lower liquid crystal substrates 1b and 1a, and then the upper and lower liquid crystal substrates 1b and 1a are laminated with a designated applied pressure (Step S108).

In positioning the substrates, at first, the positioning markers formed on the upper and lower substrates are read through the view ports 23a and 23b that are formed at the upper chamber unit 6 using the image recognition cameras 22a and 22b. In the image processing part the image signals transmitted from the cameras are processed and the positions of the makers are estimated; and then, a high precision positioning is performed by finely operating the XYθ-direction drive mechanism, not shown, at the lower chamber par T1. In this fine adjustment, the gap between the upper chamber unit 6 and lower chamber unit 5 is maintained to a designated distance by the ball bearing 13, so that the O-ring 12 may not be deformed extremely and a designated reduced pressure level may be established.

Figure 10:
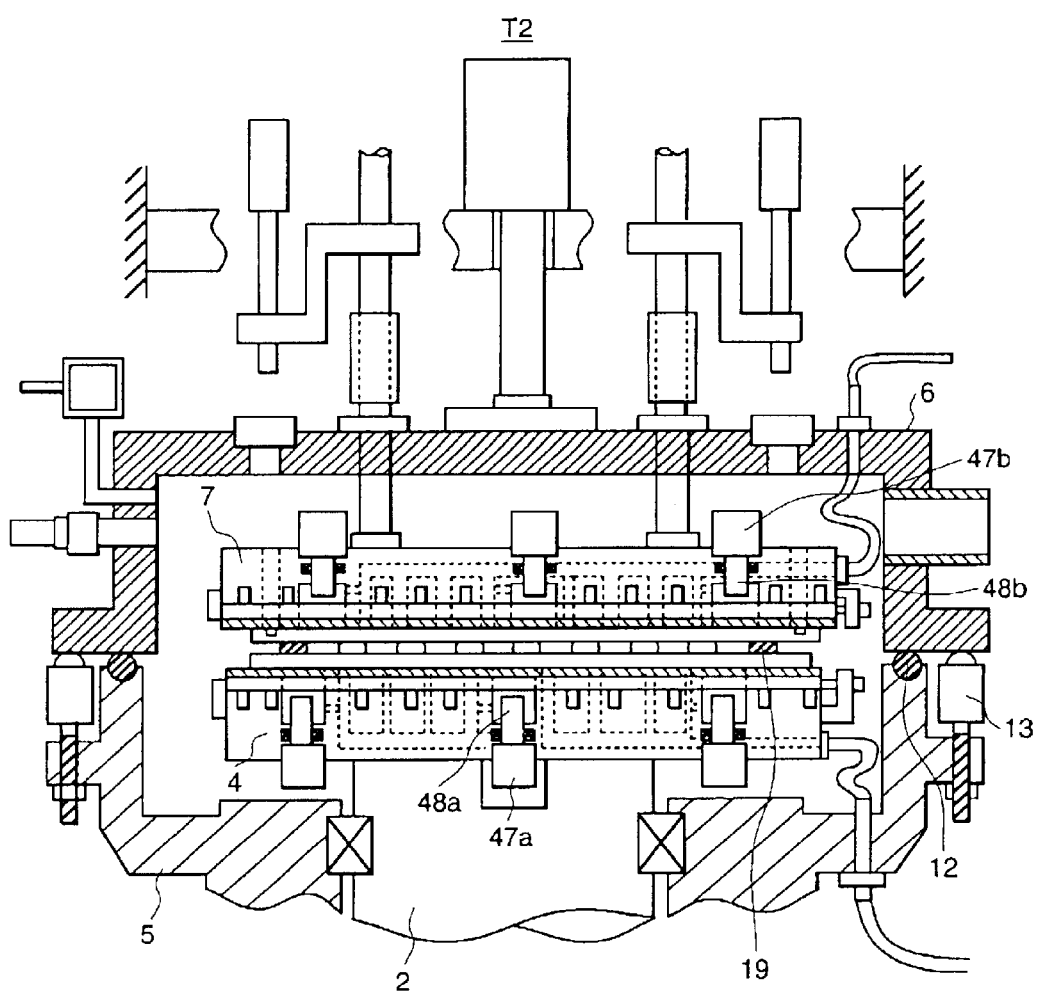
FIG. 10 is a cross-sectional view showing a state in which the vacuum chamber is formed for applying the substrate laminating operation shown in FIG. 8.
Figure 11A:
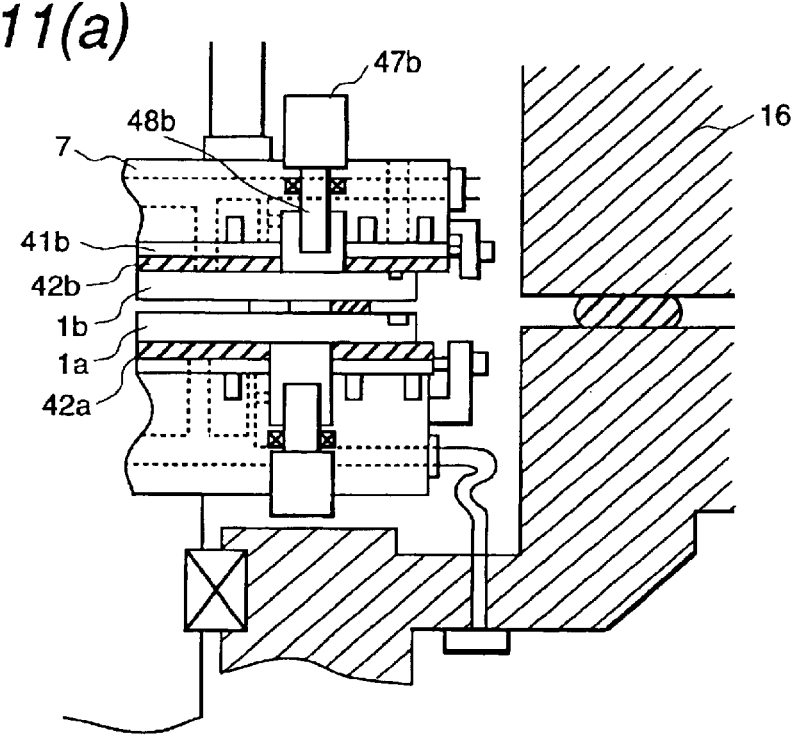
FIGS. 11(a) and 11(b) are partial enlarged sectional views illustrating the procedure for removing the adhesive sheet shown in FIG. 8 from the surface of the substrate (liquid crystal cell pc).
Figure 11B:
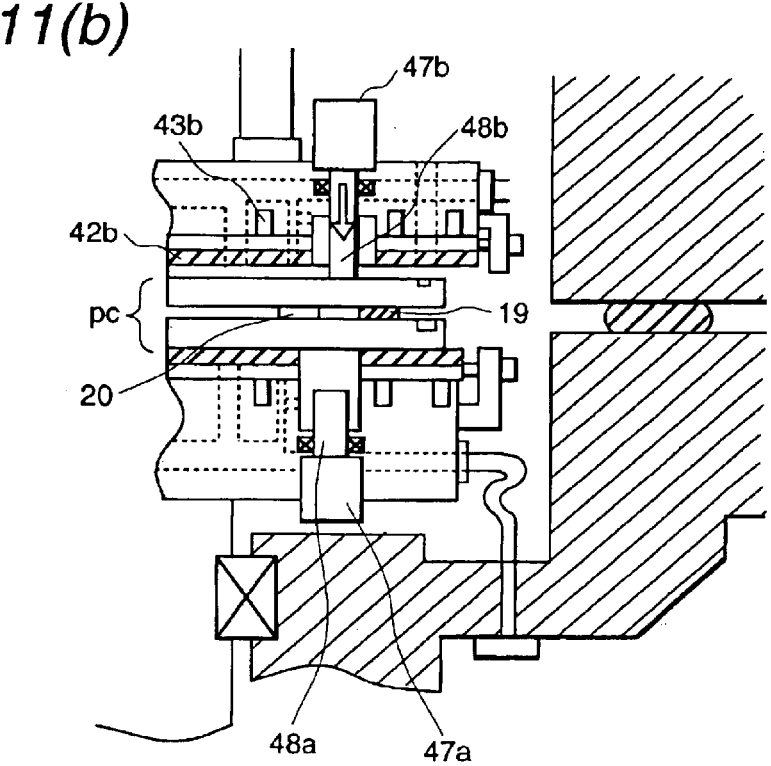

After laminating the substrates, the procedure proceeds to the operation for removing the adhesive members 42b and 42a from the upper and lower liquid crystal substrates, respectively, that is, from the cell pc. This operation is performed in the process shown FIG. 10 and FIGS. 11(a), 11(b). FIG. 10 and FIG. 11(a) shows the state after laminating the substrates in the chamber with its inside pressure reduced. In this state, as shown in the figures, the press shafts 48b and 48a (hereinafter referred to also as press pins) inside the open ports 30b and 30a are spaced apart from the liquid crystal substrates 1b and 1a of the cell pc. Next, as shown in FIG. 11(b), for the upper liquid crystal substrate 1b forming the cell pc, the press shaft 48b is moved down in the direction shown by the arrow by operating the actuator 47b, and the surface of the laminated upper liquid crystal substrate 1b is pressed with a designated pressure level (Step S109), so that the pressurizing plate 7 is moved up in this state (Step S110). At this time, since the press shaft 48b presses down the upper liquid crystal substrate 1b of the cell pc with a designated pressure, it can remove the adhesive sheet 42b from the upper liquid crystal substrate 1b (this removing method is hereinafter referred to also as pressurized removing) (Step S111). Then, the press shaft 48b is moved up and separated from the upper liquid crystal substrate 1b (Step S112). Next the pressure inside the chamber is recovered to atmospheric pressure, and the upper chamber unit 6 is moved up (Step S113). The remaining cell pc can be separated from the adhesive sheet 42a by moving up the lower press shaft 48a upward (Step S114). After which, the laminated liquid crystal substrate (liquid crystal cell pc) is carried out by moving the lower chamber part T1 in the horizontal direction (Step S115).

For the step of removing the adhesive sheet 42b from the upper liquid crystal substrate 1b of the cell pc, what is described in the above embodiment is a pressurized removing process in which the press shaft 48b applies a designated pressure to the upper substrate 1b. Alternatively, it is possible to fix the stop position of the shaft 48b temporarily when the press shaft 48b moves down and contacts to the upper liquid crystal substrate 1b, so that the pressuring plate 7 is moved up and the press shaft 48b is moved down synchronously through a distance equivalent to the length through which the pressurizing plate 7 is moved up, in order to remove the adhesive sheets, without altering their positions (this removing method is hereinafter referred to also as position fixing removing).

It will be appreciated that, if the surface of the adhesive sheet is partially separated from the adhesive sheet 42b and the upper liquid crystal substrate 1b by ejecting the positive-pressure air or gas to the surface of the upper liquid crystal substrate 1b from the suction ports 7d and the open ports 30b prior to removing the adhesive sheet 42b from the upper substrate 1b of the cell pc with the press operation of the press shafts 48b, the substrate can be removed merely by pushing the press shafts 48b without applying any excessive pressure to the upper liquid crystal substrate. When removing the lower liquid crystal substrate 1a of the cell pc from the adhesive sheet 42a, it will be appreciated that, if the surface of the adhesive sheet is partially separated from the adhesive sheet 42a and the lower liquid crystal substrate 1a by ejecting the positive-pressure air or gas to the surface of the lower liquid crystal substrate 1a from the suction ports 7c and the open ports 30a prior to the pushing operation with the press shafts 48a, the substrate can be removed merely by pushing the press shafts 48a without applying any excessive pressure to the lower liquid crystal substrate. In the above embodiments, in which the adhesive member is composed of a single adhesive sheet, it is possible that, in case the size of the substrates to be laminated is larger, that is, the size of the pressurizing plate 7 and the table 4 is larger, a plurality of separated adhesive sheets may be provided on the surface of the pressurizing plate 7 and the table 4.

In addition, in this embodiment, in which the adhesive mechanism is provided on the pressurizing plate 7 with the aid of the table 4 and the iron plates 41 and 41b, it is possible that plate members, such as plastic or ceramic members, may be provided instead of using the iron plates. In this case, it is required to make the mechanism robust for fixing the plate member made of plastic or ceramic at the pressurizing plate 7 and the table 4. In addition, the adhesive mechanism in this embodiment may also be realized using another method in which the adhesive member is directly provided on the surface of the table or the pressurizing plate.

It is possible that the actuator 44b embedded inside the pressurizing plate 7 may be configured as a single unit for driving a plurality of press shafts 48b. The actuator 44a embedded inside of the table 4 may be configured to have a similar structure.

Figure 12:
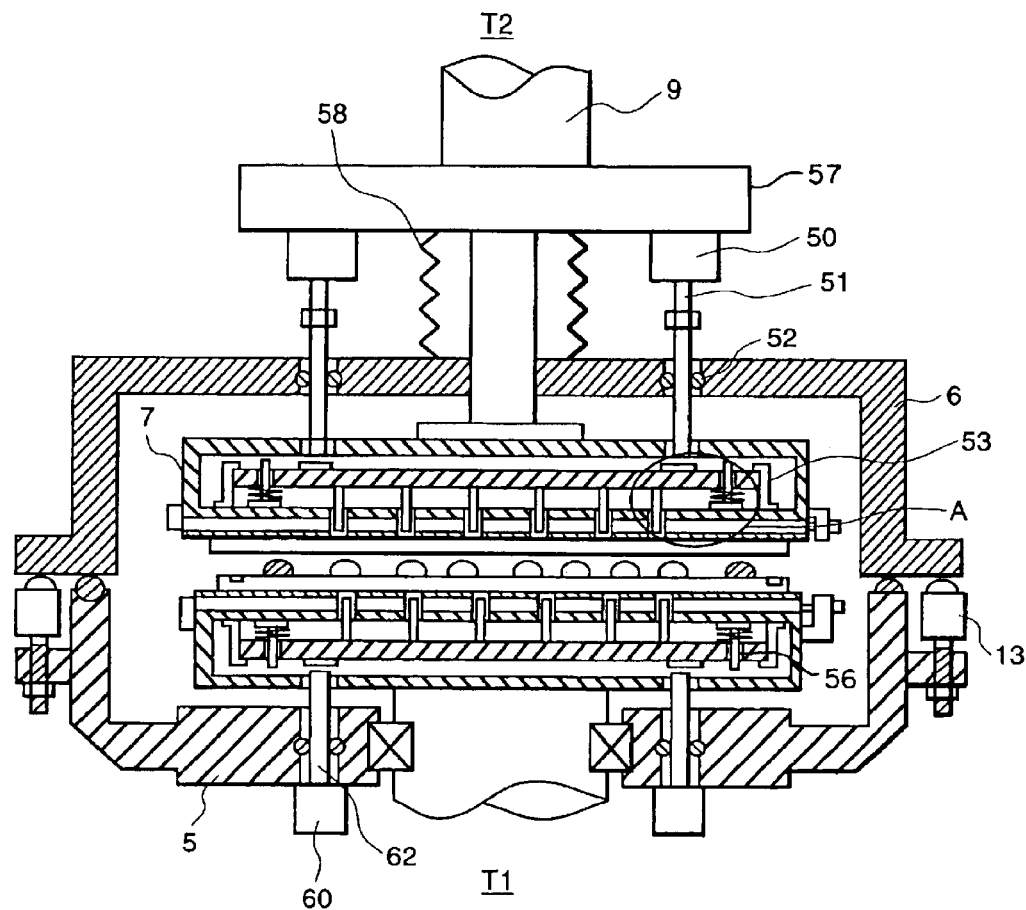
FIG. 12 is a cross-sectional view of the adhesive member removing mechanism according to another embodiment of the present invention.
Figure 12A:
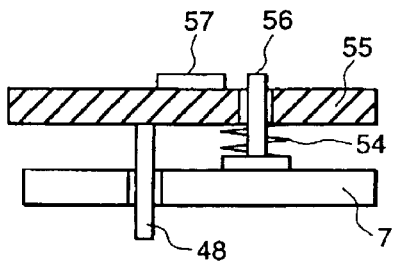
FIG. 12A is a diagram showing the detailed construction of the portion A in FIG. 12.

Next, referring to FIG. 12 and FIG. 12A, another embodiment of the present invention will be described.

In this embodiment, the configuration of the removing mechanism for removing the adhesive member from the surface of the substrate is modified. For the removing mechanism in this embodiment, a pin support plate 55 (fixing plate) has a plurality of press pins (press shafts) 48, which extend toward the pressurizing surface and are each, provided with a press spring support pin 56 and a the press spring 54, and the pin support plate is mounted via a pin support plate stopper 53 on the pressurizing surface plate 7n of the pressurizing plate 7, so as to be moveable upward and downward freely relative to the pressurizing plate 7. A support plate 57 is provided above the pin support plate 55 (at the surface opposite to the pressurizing surface), and the adhesive member 42 is removed from the surface of the upper liquid crystal substrate as the press springs 48 push the pins 56 against the surface of the upper liquid crystal substrate 1 when the support plate 57 operates to push the pin support pushing shaft 51 in response to actuation of the cylinder 50, which is mounted at the drive plate provided at the shaft 9 for driving the pressurizing plate. A bellows 58 is provided between the drive plate of the shaft 9 and the upper chamber 6, which makes it possible to maintain the reduced pressure state inside the chamber even if the pressure inside the chamber is reduced. In addition, a seal member 52 is also provided between the pin support plate pushing shaft 51 and the upper chamber unit 6, which makes it possible to maintain the reduced pressure state inside the chamber.

The table 4 has almost the same structure as the pressurizing plate. The main difference from the pressurizing plate side is that the cylinder 60 used as the drive source for moving the pin support plate pushing shaft 62 upward and downward is provided at the lower chamber unit. Though it is possible for the cylinder 50 to also be provided at the upper chamber unit 6 for the pressurizing plate side, it is required that the stroke for the pin support plate pushing shaft 51 be larger by the amount of displacement of the pressurizing plate 7 for its compensation, because the pressurizing plate 7 moves upward and downward in this case.

As described above, in this embodiment, there is an advantageous effect in that an individual drive source is not required to be provided for each individual push pin, and so the configuration of the apparatus can be simplified.

As described above, in this embodiment, an attraction and adsorption mechanism, comprising a plural of adsorption holes and an adhesive support mechanism having an adhesive member formed in a sheet, are provided at either one of the pressurizing plate or the table, and the substrate is attracted and supported, as well as adhered and supported in the atmospheric pressure state. Thus, the substrate is supported by the adhesive force even if the attracting and adsorbing force may be reduced in the process of reducing the pressure inside the chamber. The substrates are laminated by pressing the substrates at a designated reduced pressure level; and, finally, after laminating the substrates, the adhesive member is removed from the surface of the laminated substrates by using a removing mechanism comprising a plurality of pushing shafts provided at the pressurizing plate and the table.

As described above, by combining both an attractive force and an adhesive force, it will be appreciated that the liquid crystal substrates can be supported without displacement even if the pressure of the chamber is reduced, while the liquid crystal substrate is supported under the atmospheric pressure state, so that high-precision lamination work can be established. Also, the adhesive members can be removed from the surface of the liquid crystal substrate after the lamination work is completed.

In the above description, it is assumed that the substrate is used for a liquid crystal display apparatus, but it is apparent that the present invention can be applied to substrates used for plasma display and to an electro-luminescence (EL) display apparatus and the assembly process of those display apparatuses.

According to the present invention, it will be appreciated that a manufacturing process failure in the vacuum processing environment can be prevented even if the size of the liquid crystal substrate becomes larger and its thickness becomes smaller, and that the liquid crystal substrates can be laminated with high precision.

Although the present invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above, but is understood to include all possible embodiments which can be embodied within a scope encompassed and equivalent thereof, with respect to the feature set out in the appended claims.

What is claimed is:

1. A liquid crystal display apparatus manufacturing method in which one of a pair of liquid crystal substrates to be laminated is supported by an adhesion and support mechanism provided at a pressurizing plate, the other of the pair of liquid crystal substrates to be laminated, on which a liquid crystal agent is quantitatively dropped, is supported on a table and said liquid crystal substrates are disposed so as to face each other, and said liquid crystal substrates are laminated by an adhesive agent provided at either of said liquid crystal substrates with a narrowed gap in a reduced pressure environment, wherein said one of said pair of liquid crystal substrates is attracted and adsorbed to said pressurizing plate by applying an attractive and adsorbing force thereto in an atmospheric pressure; and said liquid crystal substrates are supported by an adhesive member by operating said adhesion and support mechanism at an attracted and adsorbed state.

2. A liquid crystal display apparatus manufacturing method according to claim 1, wherein after supporting one of said liquid crystal substrates with an adhesive member of an adhesion and support mechanism provided on said pressurizing plate, and laminating both liquid crystal substrates with a designated applied pressure, said adhesive member is removed from a surface of a liquid crystal substrates, while or after twisting said adhesive member.

3. A liquid crystal display apparatus manufacturing method according to claim 1 or 2, wherein both liquid crystal substrates are laminated within a chamber with its designated reduced pressure level, and next, after establishing atmospheric conditions inside said chamber by pressurizing the inside of said chamber so that an attracting and adsorbing force may act, said adhesive member is removed from said liquid crystal substrate surface by driving said adhesion and support mechanism while activating a pressurizing force.

4. A liquid crystal display apparatus manufacturing method in which one of a pair of liquid crystal substrates to be laminated is supported by an adhesion and support mechanism provided at a pressurizing plate, the other of said pair of liquid crystal substrates to be laminated is supported on a table and said liquid crystal substrates are disposed so as to face each other inside a chamber, and said liquid crystal substrates are laminated by an adhesive agent provided at either of said liquid crystal substrates with a narrowed gap in a reduced pressure environment, wherein one of said substrates is supported by an adhesive means provided inside said pressurizing plate; and when an adhesive member is retracted inside a pressurizing plate after laminating both substrates, said adhesive member is retracted while or after twisting said adhesive member with respect to a substrate surface.

5. A liquid crystal display apparatus manufacturing method according to claim 4, wherein in a process for laminating said both substrates, after reducing the pressure inside said chamber to a designated reduced pressure level, said pressurizing plate is moved and both substrates are laminated by squeezing an adhesive agent provided on either one of said substrates, and then the pressure inside said chamber is increased up to a reduced pressure level as required to enable support of said substrates by attraction and adsorption, positioning markers are observed in an attraction and adsorption state, next a pressurizing plate applies an applied pressure to the substrates while positioning then until a designated applied pressure level is attained, and subsequently said adhesive member is twisted and retracted.

6. A substrate assembly apparatus, comprising a pressurizing plate for supporting one of a pair of liquid crystal substrates to be laminated, an adhesion and support mechanism for said one of said substrates provided at said pressurizing plate, and a table supporting the other of said pair of liquid crystal substrates to be laminated, in which a gap between substrates is established by a drive mechanism provided on at least one of said pressurizing plate or said table, and said substrates are laminated with an adhesive agent provided on at least one of said substrates in a reduced pressure atmosphere, wherein a plural of suction ports are provided at said pressurizing plate for supporting said one substrate with a negative pressure; and a gas flow channel extends from a suction port to an open port, in which an adhesive member of said adhesion and support mechanism is directed.

7. A substrate assembly apparatus according to claim 6, wherein said adhesion and support mechanism has an adhesive member for supporting a substrate, and a drive mechanism for twisting and retracting said adhesive member from a substrate surface.

8. A substrate assembly apparatus according to claim 6 or 7, wherein said adhesion and support mechanism is provided also at said table.

9. A liquid crystal display apparatus manufacturing method in which one of a pair of liquid crystal substrates to be laminated is supported by a pressurizing plate, the other of said pair of liquid crystal substrates to be laminated, on which a liquid crystal agent is quantitatively dropped, is supported on a table and said liquid crystal substrates are disposed so as to face each other, and said liquid crystal substrates are laminated by an adhesive agent provided at either of said liquid crystal substrates with a narrowed gap in a vacuum pressure, wherein said one of said pair of liquid crystal substrates is supported by an adhesive member provided at said pressurizing plate so as to be removable, and after laminating both liquid crystal substrates, said adhesive member is removed from a liquid crystal substrate by extending at least one or more pushing members from said pressurizing plate in order to push said liquid crystal substrate.

10. A liquid crystal display apparatus manufacturing method according to claim 9, wherein said other of said pair of liquid crystal substrates is supported by an adhesive member provided at said table, and after laminating both liquid crystal substrates, said adhesive member is separated from a liquid crystal substrate by extending at least one or more pushing members provided at said table toward a liquid crystal substrate surface in order to push said liquid crystal substrate.

11. A substrate assembly apparatus in which one of a pair of substrates is supported on a pressurizing plate at an upper area of a vacuum chamber, the other of said pair of substrates to be laminated is supported on a table at a lower area of a vacuum chamber and both substrates are disposed so as to face each other, and both substrates are laminated with an adhesive agent provided on at least one of said substrates and in a reduced pressure atmosphere and with a narrow gap between both substrates, comprising an adhesion and support mechanism having an adhesive member formed in a sheet and mounted so as to be in contact with and removable from said pressurizing plate; and a removing mechanism comprising a substrate pushing shaft for removing said adhesive member from a substrate surface supported by said adhesion and support mechanism, and a drive mechanism for driving said substrate pushing shaft.

12. A substrate assembly apparatus according to claim 11, wherein said table is composed of said adhesion and support mechanism and a removing mechanism comprising a substrate pushing shaft and a drive mechanism for driving said pushing shaft.

13. A substrate assembly apparatus according to claim 11 or 12, wherein said adhesion and support mechanism has a configuration in which an adhesive member is bonded to an iron plate, and support of the iron plate is established by a magnet provided at said pressurizing plate or said table.

14. A substrate assembly apparatus according to claim 11 or 12, wherein a penetration hole is provided at a part of said adhesion and support mechanism through which a substrate pushing shaft of said removing mechanism can move.

15. A substrate assembly apparatus according to claim 11, wherein a suction port for carrying out an attracting and adsorbing operation is provided at said pressurizing plate and a penetration hole for carrying out an attracting and adsorbing operation is provided at said adhesion and support mechanism so as to maintain contact by a substrate with a surface to be used for the attracting operation on a substrate in association with said suction port, and an adhesive member is provided so as to extend outside from said penetration hole.

16. A substrate assembly apparatus according to claim 11, wherein said removing mechanism is composed of a fixing plate provided with a plurality of pushing shafts and a drive mechanism for driving said fixing plate.

* * * * *

UNITED STATES PATENT AND TRADEMARK OFFICE
CERTIFICATE OF CORRECTION

PATENT NO.       : 6,922,229 B2
APPLICATION NO.  : 10/387377
DATED            : July 26, 2005
INVENTOR(S)      : Yawata et al.

It is certified that error appears in the above-identified patent and that said Letters Patent is hereby corrected as shown below:

On the title page item (75), should read:  Satoshi Yawata, Kashiwa (JP);
Kiyoshi Imaizumi, Ushiku (JP);
Masatomo Endoh, Edosaki-machi (JP);
Tatsuharu Yamamoto, Ryugasaki (JP);
Makoto Nakahara, Nara (JP);
Mitsuaki Morimoto, Nara (JP);
Naoto Yokoyama, Nara (JP);
Takatoshi Kira, Nara (JP)

Signed and Sealed this

Third Day of June, 2008

JON W. DUDAS
*Director of the United States Patent and Trademark Office*